(12) United States Patent
Boyce

(10) Patent No.: US 6,873,425 B1
(45) Date of Patent: Mar. 29, 2005

(54) DELAYED PRINTING OF PRINT JOBS REQUIRING SPECIAL RESOURCES

(75) Inventor: James S. Boyce, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 932 days.

(21) Appl. No.: 09/651,986

(22) Filed: Aug. 30, 2000

(51) Int. Cl.[7] .......................... G06F 15/00; G06G 15/00
(52) U.S. Cl. ........................ 358/1.14; 358/269; 399/18; 399/23
(58) Field of Search ................................ 358/296, 437, 358/1.16, 269, 1.14, 1.1; 399/18, 23, 39; 709/219, 203

(56) References Cited

U.S. PATENT DOCUMENTS

| | | | |
|---|---|---|---|
| 4,843,571 A | | 6/1989 | Notermans et al. |
| 5,717,841 A | | 2/1998 | Farrell et al. |
| 5,889,944 A | * | 3/1999 | Butt et al. .................. 709/203 |
| 5,966,555 A | * | 10/1999 | Nakajima et al. ............. 399/18 |
| 5,974,232 A | * | 10/1999 | Kamiya ...................... 709/238 |
| 6,122,073 A | * | 9/2000 | Miyasaka et al. ........... 358/434 |
| 6,504,621 B1 | * | 1/2003 | Salgado ..................... 358/1.16 |

FOREIGN PATENT DOCUMENTS

| | | |
|---|---|---|
| EP | 0944238 A1 | 9/1999 |
| GB | 2368698 A | 5/2002 |

* cited by examiner

Primary Examiner—Kimberly Williams
Assistant Examiner—Saeid Ebrahimi

(57) ABSTRACT

A print job requiring unavailable resources is held until the deficiency is remedied. The resource requirements of the print job are evaluated. The resource requirements are compared to known available resources. Either standard resources are assumed or available resources for the printer are discovered. Responsive to a resource deficiency exposed by the comparison, the print job is communicated to a printer with a command to hold the print job. Also responsive to the resource deficiency exposed by the comparison, instructions for remedying the resource deficiency are created and the instructions are provided to a remedy provider. The instructions are provided to the remedy provider either by printing the instructions or by displaying the instructions on the printer. The remedy provider remedies the resource deficiency and the printer processes the print job. Alternatively, the resource deficiency is communicated to the printer, the resource deficiency is monitored for a remedy, and responsive to the remedy of the resource deficiency, the print job is processed.

14 Claims, 2 Drawing Sheets

US 6,873,425 B1

DELAYED PRINTING OF PRINT JOBS REQUIRING SPECIAL RESOURCES

FIELD OF THE INVENTION

This invention relates in general to printing technology and, more particularly, to delaying a print job that requires user intervention to allow other print jobs to be processed.

BACKGROUND OF THE INVENTION

Occasionally, user or operator intervention is necessary for completing a print job. For example, a print job may call for a size or type of media that is not available to the printer without user intervention. The media may be unavailable because it is not typically loaded into the printer or because the printer has depleted its supply of the media.

Conventionally, when user intervention is required for completion of a print job, the printer either waits for the intervention without allowing other print jobs to be processed or else the printer flushes the print job requiring intervention so that other print jobs may be processed. Neither of these solutions is adequate. Requiring all jobs to wait until the required intervention has been satisfied causes unnecessary delays for other jobs where no intervention is required. Flushing a print job to allow other jobs unnecessarily requires the user to reprint the job requiring intervention.

Printers have recently been developed that are able to store or hold print jobs for later printing. These printers are often used to create multiple copies of a document. Typically, a job is printed and held. A user or operator may later retrieve the print job and reprint it. Alternatively, the printer may be made to hold the print job without printing an original first.

SUMMARY OF THE INVENTION

According to principles of the present invention, a print job requiring unavailable resources is held until the deficiency is remedied. The resource requirements of the print job are evaluated. The resource requirements are compared to known available resources. Responsive to a resource deficiency exposed by the comparison, the print job is communicated to a printer with a command to hold the print job.

According to further principles of the present invention, responsive to the resource deficiency exposed by the comparison, instructions for remedying the resource deficiency are created and the instructions are provided to a remedy provider. The instructions are provided to the remedy provider either by printing the instructions or by displaying the instructions on the printer. The remedy provider remedies the resource deficiency and the printer processes the print job.

According to further principles of the present invention, either standard resources are assumed or available resources for the printer are discovered.

According to further principles of the present invention, either the remedy provider remedies the deficiency and commands the printer to process the print job or the resource deficiency is communicated to the printer, the resource deficiency is monitored for a remedy, and responsive to the remedy of the resource deficiency, the print job is processed.

DETAILED DESCRIPTION OF THE INVENTION

Figure 1:
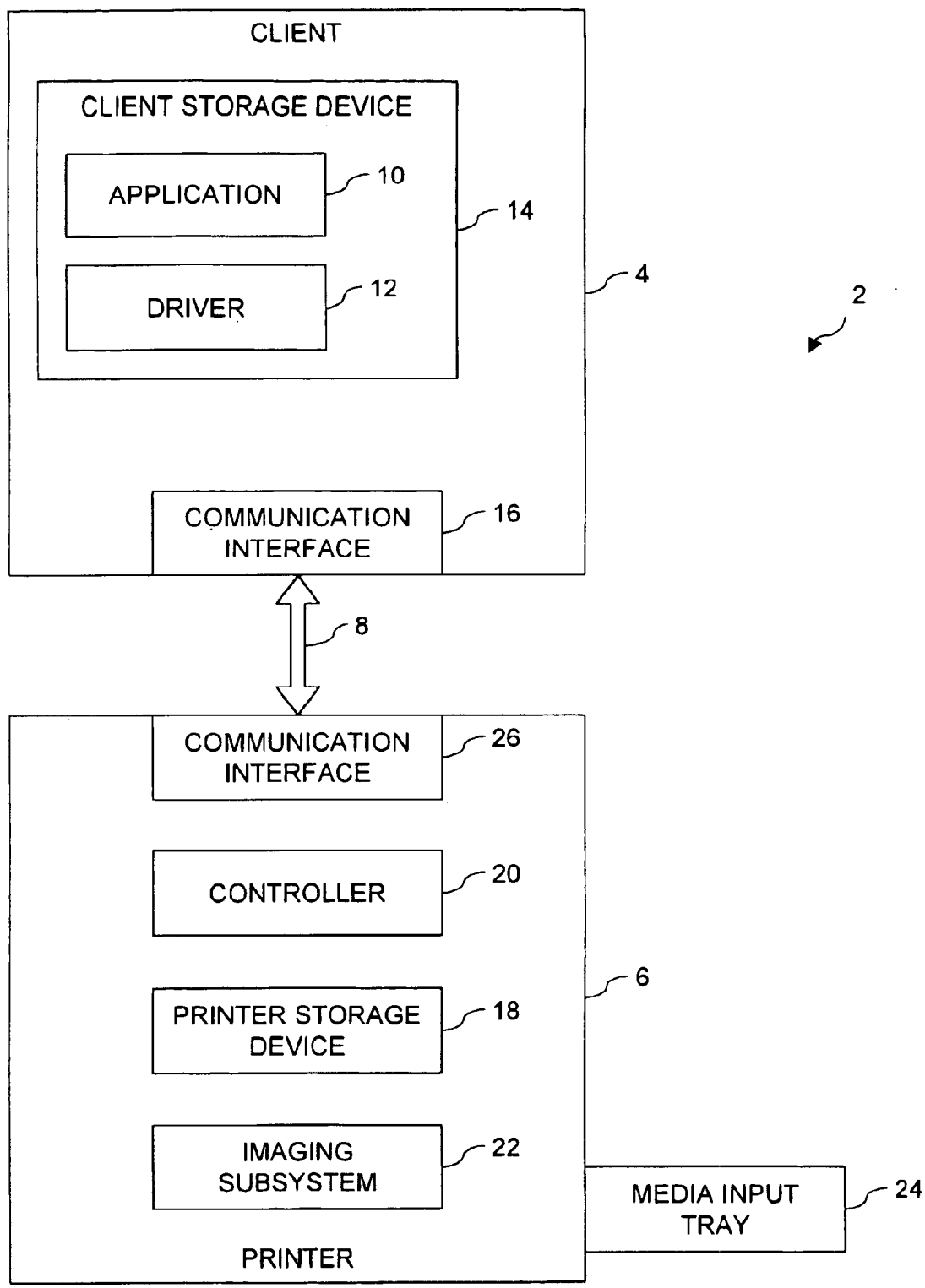
FIG. 1 is a block diagram representing one embodiment of the system of the present invention for holding a print job requiring unavailable resources.

Illustrated in FIG. 1 is a system 2, having a client 4, a printer 6, and a communications path 8. Communication path 8 is any path for providing communication between client 4 and printer 6. For example, communication path 8 may be a direct connection or a network.

Client 4 is any device or system, such as a specific or general purpose computer, that includes a means, such as a processor, for processing executable code. Client 4 includes an application 10, a driver 12, a storage device 14, and a communications interface 16. Application 10 is any user application that uses device drivers 12 for interfacing with printer 6. Device drivers 12 are executable code for interfacing between applications 10 and printer 6.

Storage device 14 is any device for storing data or executable code. Storage device 14 may also be a program storage device tangibly embodying a program, applet, or instructions executable by client 4 for performing the method steps of the present invention executable by client 4. Storage device 14 may be any type of storage media such as magnetic, optical, or electronic storage media. Stored within storage device 14 may be application 10 and device driver 12.

Communication interface 16 is any means or interface for allowing client 4 to communicate over communications path 8. For example, communication interface 16 may be a direct connection interface or a network interface.

Printer 6 is any device or system for outputting a print job onto print media. Printer 6 includes storage device 18, a controller 20, an imaging subsystem 22, a media input tray 24, and a communication interface 26.

Storage device 18 is any device for storing a print job. Storage device 18 may be any type of storage media such as magnetic, optical, or electronic storage media.

Controller 20 is any device for controlling print jobs within printer 6. For example, controller 20 may include a processor or hardwired logic. Imaging subsystem 22 is any system or device controlled by controller 20 for outputting a print job onto print media. Media input tray 24 is any single or multiple sheet media feeder for feeding to printer 6 to output a print job.

Communication interface 26 is any means or interface for allowing printer 6 to communicate over communication path 8. For example, communication interface 26 may be a direct connection interface or a network interface.

Figure 2:
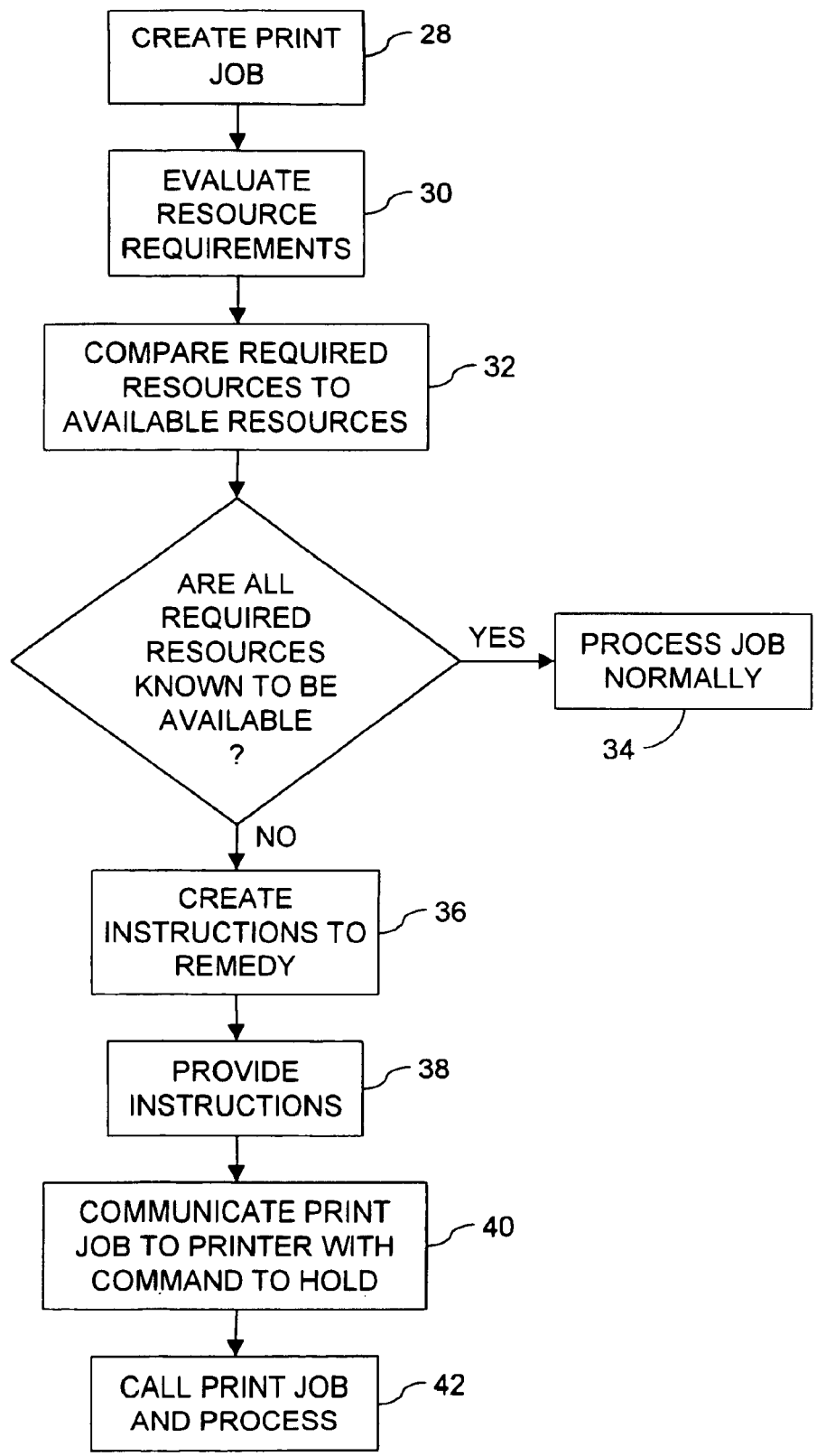
FIG. 2 is a flow chart illustrating one embodiment of the method of the present invention for holding a print job requiring unavailable resources.

FIG. 2 is a flow chart representing the steps of one embodiment of the present invention. Although the steps represented in FIG. 2 are presented in a specific order, the present invention encompasses variations in the order of steps. Furthermore, additional steps may be executed between the steps illustrated in FIG. 2 without departing from the scope of the present invention.

A print job is generated 28 by driver 12. If necessary, application 10 first launches driver 12 and delivers to driver 12 information or data necessary for creating the print job. The print job is evaluated 30 to learn the resource requirements of the print job. Either driver 12 or other software (not shown) evaluates 30 the print job. Examples of resource requirements include print media and printer 6 configurations.

The resource requirements of the print job are compared 32 to the known available resources of printer 6. It may be desirable to assume that printer 6 has only standard media type and a basic configuration. This assumption accounts for changes that may occur to the printer between the time of the comparison and the time the print job is output by printer 6. Alternatively, printer 6 may be polled to determine its available resources. Many types of printers 6 may be polled using simple network management protocol (SNMP) commands.

If all of the required resources are available in printer 6, the print job is processed in a conventional manner. If one or more of the required resources is deficient in printer 6, instructions are created 36 for remedying the deficiency.

The instructions are provided 38 to a remedy provider. Examples of a remedy provider include a user, an operator, or an automated remedy provider. The instructions may be provided to the remedy provider in any manner in which the remedy provider may understand the instructions. For example, the instructions may be printed on print media or displayed by printer 6 for a user or operator to read. The instructions may also be communicated to an automated remedy provider in machine readable form.

One example of a remedy that may be required is making a particular media type available to printer 6. For example, placing A4 sized transparency in a particular media input tray 26. Another example of a remedy that may be required is changing the configuration of printer 6, for example, setting printer 6 for duplex printing or staple finishing.

The print job is communicated 40 to printer 6 with a command to hold the print job in storage device 18 until called. Other print jobs may be processed on printer 6 while the print job is held.

When the deficiency is remedied, the print job is called 42 by controller 20 and processed by imaging subsystem 22. The job is either called 42 manually by the remedy provider or alternatively called 42 by controller 20 from storage device 18. For controller 20 to call 42 the print job, the resource deficiency is communicated to printer 6. Controller 20 monitors the resource deficiency for a remedy and responsive to the remedy of the resource deficiency, calls 42 the print job from storage device 18 for processing.

The foregoing description is only illustrative of the invention. Various alternatives and modifications can be devised by those skilled in the art without departing from the invention. Accordingly, the present invention embraces all such alternatives, modifications, and variances that fall within the scope of the appended claims.

What is claimed is:

1. A method for holding a print job requiring unavailable resources, the method comprising:
   (a) evaluating the resource requirements of the print job;
   (b) comparing the resource requirements to known available resources;
   (c) responsive to a resource deficiency exposed by the comparison, communicating the print job to a printer with a command to hold the print job; and,
   (d) responsive to a resource deficiency exposed by the comparison, printing instructions, onto print media, for remedying the resource deficiency.

2. The method of claim 1 further including:
   (a) remedying the resource deficiency; and,
   (b) the printer processing the print job.

3. The method of claim 1 wherein comparing the resource requirements to known available resources includes:
   (a) discovering available resources for the printer; and,
   (b) comparing the resource requirements to the discovered available resources.

4. The method of claim 1 further including:
   (a) communicating to the printer the resource deficiency;
   (b) monitoring the resource deficiency for a remedy; and,
   (c) responsive to the remedy of the resource deficiency, processing the print job.

5. A system for holding a print job requiring unavailable resources, the system comprising:
   (a) a print driver configured to evaluate the resource requirements of the print job;
   (b) the print driver further configured to compare the resource requirements to known available resources; and,
   (c) the print driver further configured to respond to a resource deficiency exposed by the comparison, by communicating the print job to a printer with a command to hold the print job.

6. The system of claim 5 further including a remedy provider and wherein the print driver is further configured to respond to a resource deficiency exposed by the comparison by creating instructions for remedying the resource deficiency and providing the instructions to a remedy provider.

7. The system of claim 6 wherein the print driver configured to respond to a resource deficiency exposed by the comparison by providing the instructions to a remedy provider includes the print driver configured to respond to a resource deficiency exposed by the comparison by communicating the instructions to the printer for printing.

8. The system of claim 6 wherein the print driver configured to respond to a resource deficiency exposed by the comparison by providing the instructions to a remedy provider includes the print driver configured to respond to a resource deficiency exposed by the comparison by communicating the instructions to the printer for display on the printer.

9. The system of claim 6, further including:
   (a) means for the remedy provider remedying the resource deficiency; and,
   (b) the printer configured to process the print job.

10. The system of claim 5 wherein the print driver further configured to compare the resource requirements to known available resources includes:
    (a) the print driver further configured to discover available resources for the printer; and,
    (b) the print driver further configured to compare the resource requirements to discovered available resources.

11. The system of claim 5 further including:
    (a) the driver configured to communicate the resource deficiency to the printer;
    (b) the printer configured to monitor the resource deficiency for a remedy; and,
    (c) the printer configured to respond to the remedy of the resource deficiency by processing the print job.

12. A program storage device readable by a computer, tangibly embodying a program, applet, or instructions executable by the computer to perform method steps for holding a print job requiring unavailable resources, the method steps comprising:
    (a) evaluating the resource requirements of the print job;
    (b) comparing the resource requirements to known available resources;

(c) responsive to a resource deficiency exposed by the comparison, communicating the print job to a printer with a command to hold the print job; and, (d) responsive to a resource deficiency exposed by the comparison, printing instructions, onto print media, for remedying the resource deficiency.

13. The program storage device of claim 12 wherein the method step of comparing the resource requirements to known available resources includes:

(a) discovering available resources for the printer; and, (b) comparing the resource requirements to the discovered available resources.

14. The program storage device of claim 12 wherein the method steps further include communicating to the printer the resource deficiency.

* * * * *